US006493111B2

(12) United States Patent
Inukai et al.

(10) Patent No.: US 6,493,111 B2
(45) **Date of Patent: *Dec. 10, 2002**

(54) COLOR RECORDING APPARATUS

(75) Inventors: Yoshinori Inukai, Kawasaki (JP); Kenichi Nagasawa, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/707,232

(22) Filed: Sep. 3, 1996

(65) Prior Publication Data

US 2002/0044672 A1 Apr. 18, 2002

(30) Foreign Application Priority Data

Sep. 5, 1995 (JP) ............................................ 7-227997

(51) Int. Cl.[7] ............................................ G06F 15/00
(52) U.S. Cl. ....................................... 358/1.9; 358/1.15
(58) Field of Search ............................ 400/88; 347/85; 358/473, 501, 1.9, 1.14, 1.15; 361/680; 345/163, 150, 154; 395/113, 114, 109; 382/163

(56) References Cited

U.S. PATENT DOCUMENTS 5,112,149 A * 5/1992 Suenaga ...................... 400/88
5,126,955 A * 6/1992 Tomoda ...................... 361/680
5,521,723 A * 5/1996 Madden et al. ............. 358/501
5,650,811 A * 7/1997 Seccombe et al. ............ 347/85

* cited by examiner

*Primary Examiner*—Joseph Mancuso
*Assistant Examiner*—Vikkram Bali
(74) *Attorney, Agent, or Firm*—Morgan & Finnegan, LLP

(57) ABSTRACT

There is provided a quite novel popular color recording apparatus which breaks the existing system such as PC and color printer by constructing by a display, a main body housing for enclosing the display and a data processing unit for allowing the display to display predetermined colors and mixed colors of those colors and for forming color data corresponding to the colors displayed on the display and a hand-piece, connected to the main body housing through a connecting portion, for receiving the color data transferred through the connecting portion and for performing the recording by recording materials corresponding to the colors displayed on the display.

10 Claims, 6 Drawing Sheets

| |
|---|
| FIG. 5A |
| FIG. 5B |

COLOR RECORDING APPARATUS

BACKGROUND OF THE INVENTION

1. Field of the Invention

The invention relates to a color recording apparatus and, more particularly, to a color recording apparatus which can properly select a recording material corresponding to a desired color and record.

2. Related Background Art

In recent years, a low-price printer which can reproduce ten thousands of colors has been provided by a progress of a color recording technique. On the other hand, a computer technique mainly regarding a personal computer (PC) has been remarkably advanced. As for a color printing as well, various application softwares have been produced as products.

For example, in many cases, an application software called an "OEKAKI (drawing) software", has been installed in the PC or the like, so that the color printing is being familiar to general consumers.

However, such a drawing software is used under the circumstance of the PC and a color printer. At present, a tool which can be more lightheartedly used under any circumstance doesn't exist.

Particularly, a tool which can be freely carried to the outside and can record to various recording materials at a sense similar to that when using the conventional crayon, paints, or the like is not yet proposed.

SUMMARY OF THE INVENTION

It is an object of the invention to provide an exactly novel popular color recording apparatus which breaks the existing system such as PC, color printer, or the like under such a background.

Under such an object, according to the invention, there is provided a color recording apparatus comprising: a display; a main body housing for enclosing the display and a data processing unit for allowing the display to display predetermined colors and mixed colors of them and for forming color data corresponding to the color displayed on the display; and a hand-piece, connected to the main body housing through a connecting portion, for receiving the color data transferred through the connecting portion and recording by recording materials corresponding to the colors displayed on the display.

With such a construction, since a desired color displayed on the display can be directly recorded by the hand-piece, as compared with the existing system constructed by a PC and a printer, an apparatus which can be immediately used and is conveniently portable can be realized.

The above and other objects and features of the present invention will become apparent from the following detailed description and the appended claims with reference to the accompanying drawings.

DETAILED DESCRIPTION OF THE PREFERRED EMBODIMENT

An embodiment of the invention will now be described in detail hereinbelow with reference to the drawings.

Figure 1:
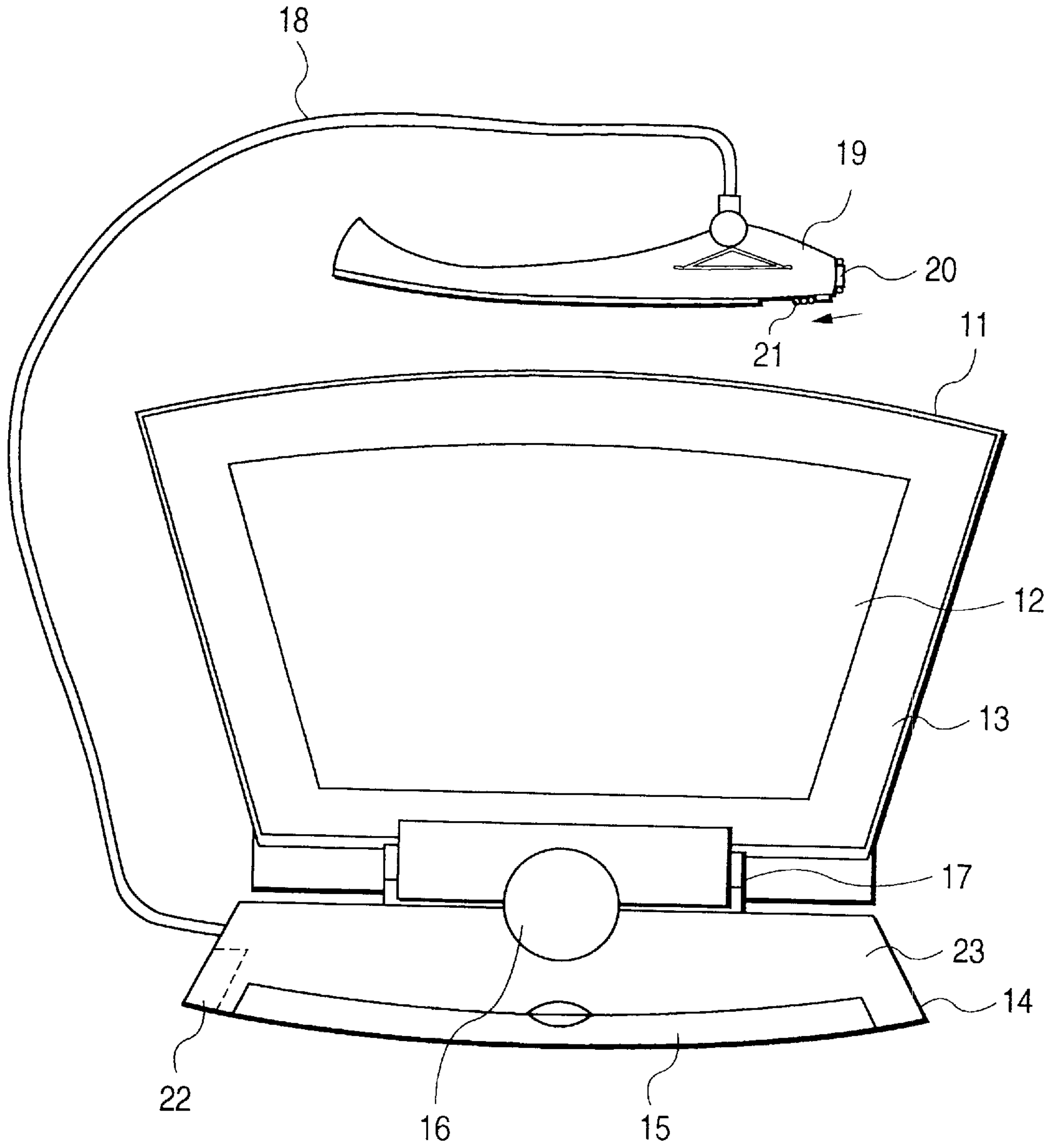
FIG. 1 is an external view showing a construction of a color recording apparatus as an embodiment of the invention.

FIG. 1 is a diagram showing a construction of a color recording apparatus as an embodiment of the invention. In the diagram, reference numeral 11 denotes a main body housing; 12 a palette-shaped liquid crystal display for displaying toned colors; 13 a touch panel arranged on a top surface of the liquid crystal display 12; 14 a holder; and 15 a knob which is slidably supported to the holder 14.

Reference numeral 16 denotes a through hole provided between the housing 11 and holder 14 and is provided so that the user can easily hold the whole apparatus by piercing the finger into the through hole 16 by the user himself; and 17 a rotating mechanism for rotatably supporting the holder 14 to the housing 11. When the apparatus is used, the holder 14 is arranged in almost parallel with the housing 11 by the rotating mechanism 17. When the apparatus is enclosed as will be explained hereinafter, the holder 14 is rotated so as to be almost overlaid to the housing 11.

Reference numeral 18 denotes a connecting portion having therein a tube for transferring ink and a cable for transmitting an electric signal. The main body housing 11 and a hand-piece 19 are connected by the connecting portion 18. The connecting portion 18 supplies color ink from ink tanks of plural colors (for example, four colors of Y, M, C, and K) built in the holder 14, transmits the electric signal to the hand-piece 19 through an interface which is built in the housing and which will be described hereinlater, and also transfers an operating state of an operating unit 21 of the hand-piece to an MPU (microprocessing unit) in the housing 11 through the interface.

Reference numeral 20 denotes a color head by the well-known bubble-jet system. The color head 20 can emit the foregoing four kinds of ink. In this instance, the operating unit 21 makes the color head operative so as to record by the colors arranged in predetermined areas (specifically speaking, areas P1, P2, and P3, which will be explained hereinafter) on the display 12.

Figure 2:
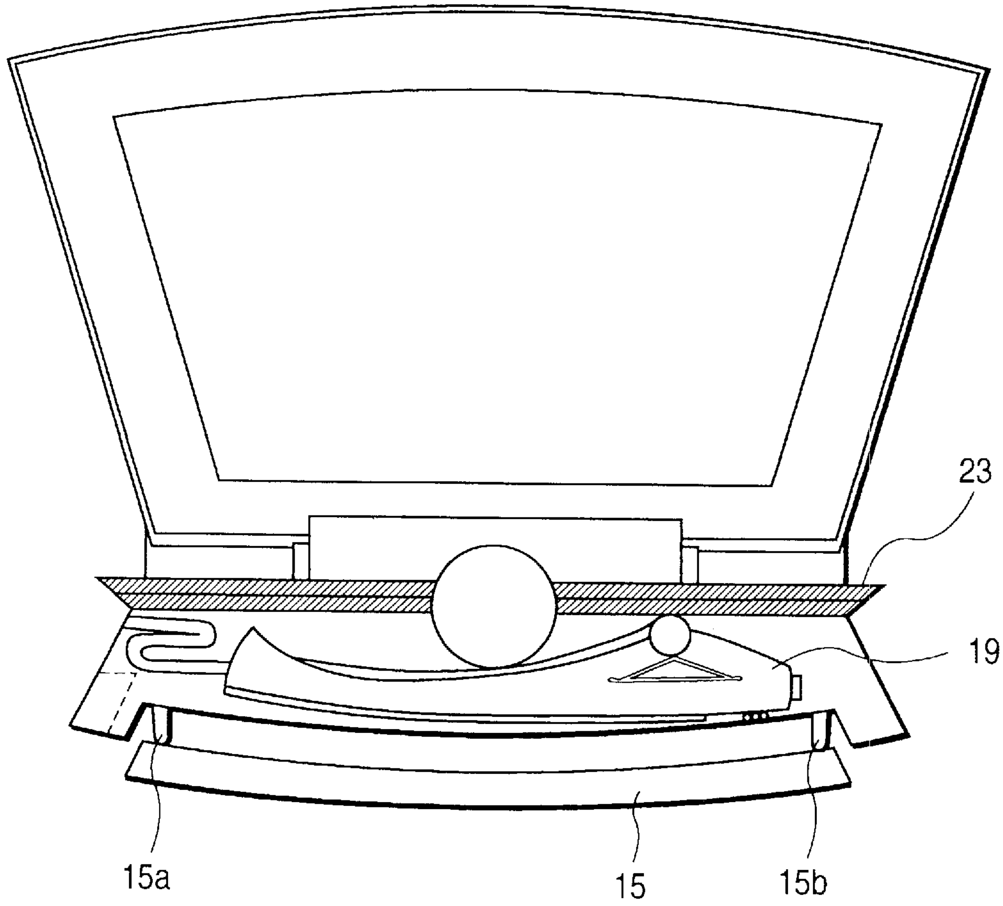
FIG. 2 is an external view showing a state in which a hand-piece of the apparatus of FIG. 1 is enclosed in a holder.

FIG. 2 is a diagram showing a state in which the hand-piece of the apparatus of FIG. 1 is enclosed in the holder 14 and which can be realized by opening or closing a cover of the holder 14. The knob 15 attached to the holder 14 is supported into a hole portion (not shown) formed in the holder 14 by slidable columnar members 15*a* and 15*b* and a portability by the user is improved.

As mentioned above, the portability of the apparatus of the embodiment is remarkably high and by inserting the finger into the through hole 16 and holding the apparatus, the user can operate the apparatus with a sense like a palette of paints. The touch panel 13 provided on the main body housing 11 is operated in order to tone and mix the colors as will be explained hereinlater. The operation by the touch panel 13 can be also executed with a sense like a palette of paints.

Figure 3:
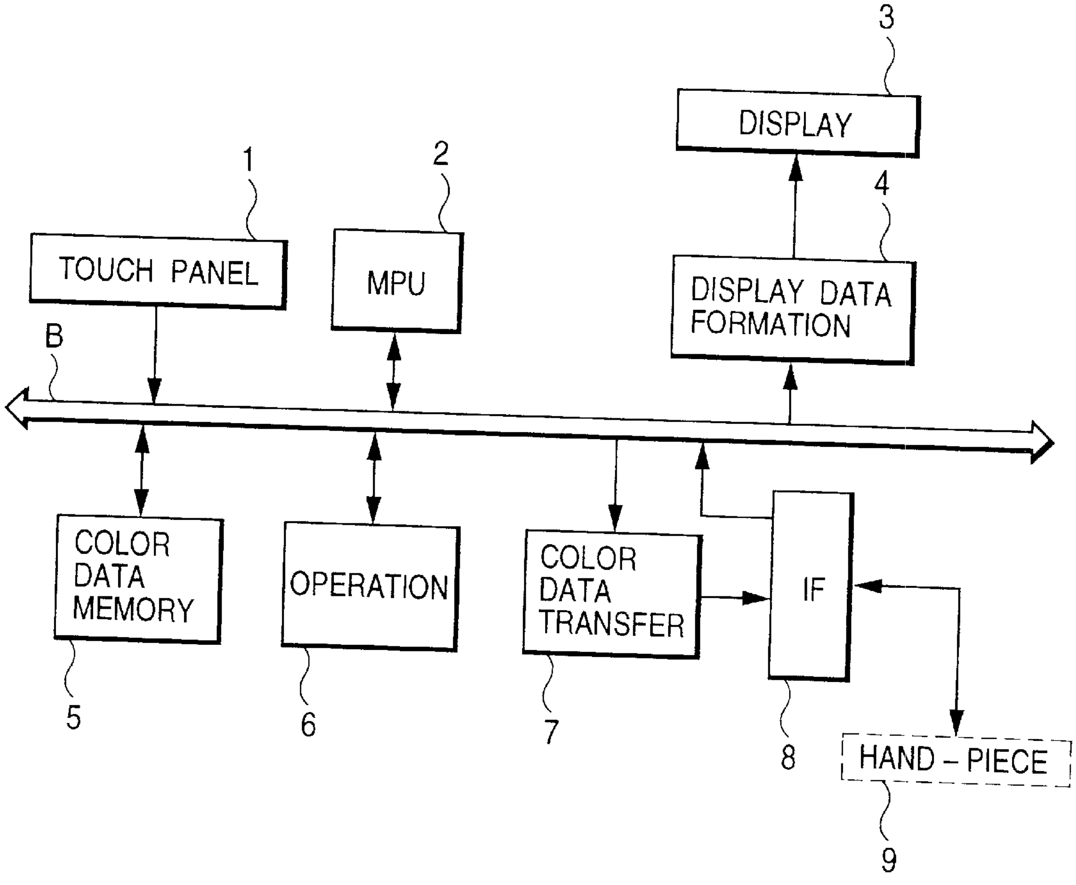
FIG. 3 is a block diagram showing a circuit construction of the apparatus of FIG. 1.

FIG. 3 is a block diagram showing a schematic construction of a circuit provided in the housing 11 of the apparatus of the embodiment. In the diagram, reference numeral 1 denotes a touch panel designated by reference numeral 13 in FIG. 1; 2 a microprocessing unit (MPU) for controlling the whole circuit; 3 a display designated by reference numeral 12 in FIG. 1; and 4 a display data formation circuit for forming a video signal to display a shape of a palette and colors on the areas of the palette onto the display 3. The circuit 4 receives color data and area data from the MPU 2, a color data memory 5, which will be explained hereinlater, and the like and forms a video signal according to those data.

Reference numeral 5 denotes the color data memory for storing and registering prepared color data indicative of a predetermined color and the mixed color formed by the apparatus; 6 an operation circuit for arithmetically operating the color data corresponding to the mixed color of a plurality of colors on the display 3; and 7 a color data transfer circuit for transferring colors to be actually recorded by a hand-piece 9 in the color data stored in the color data memory 5 to the hand-piece, for converting the color data to a format of data which can be transferred by an interface (I/F) 8, and for supplying the converted data to the I/F 8. The I/F 8 receives the color data from the color data transfer circuit 7, transfers to the hand-piece 9, and also inputs an operating state of the operating unit (designated by reference numeral 21 in FIG. 1) provided for the hand-piece 9. In this instance, the above component elements are mutually connected by a bus B under the control of the MPU 2.

Figure 4:
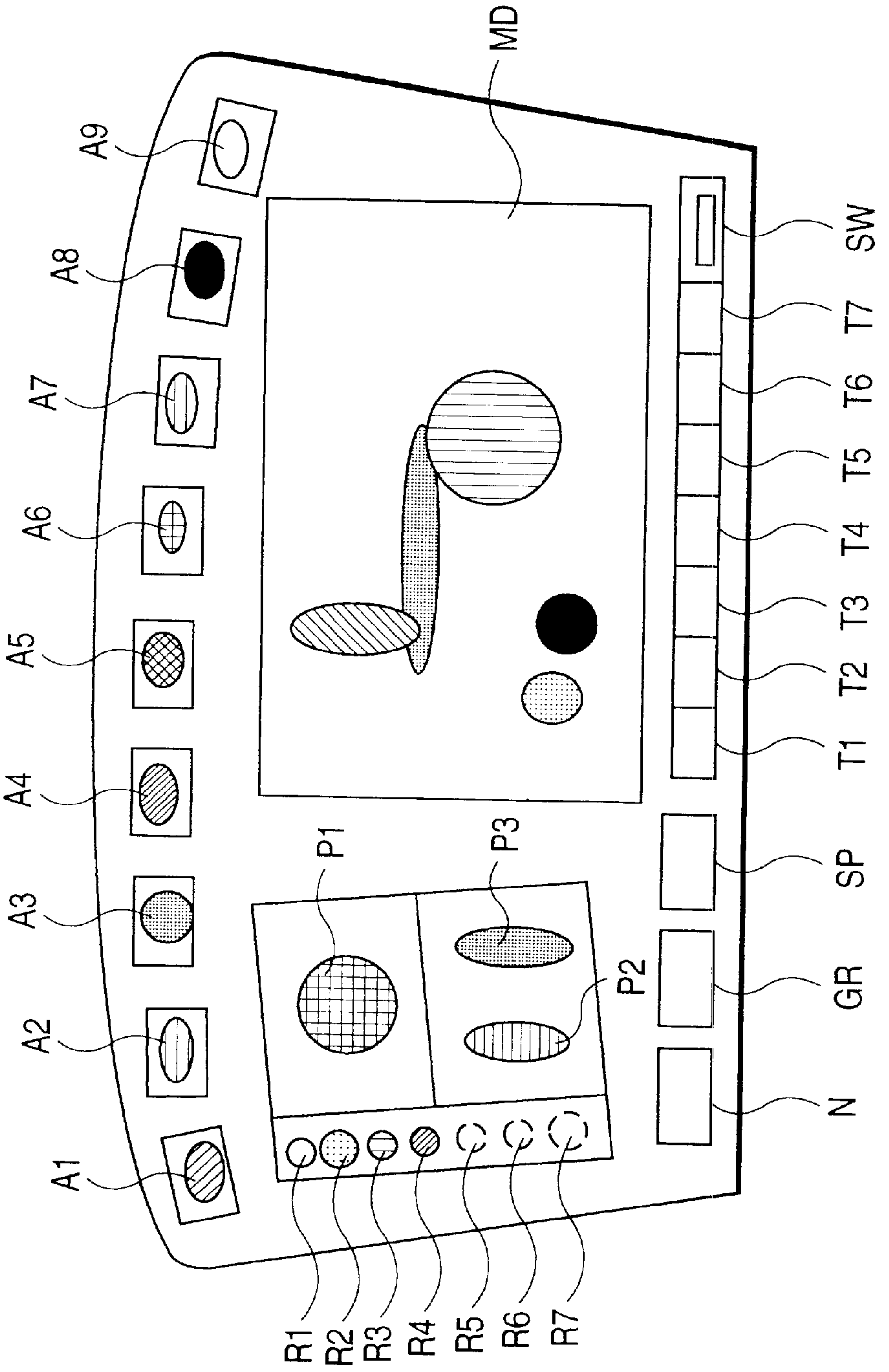
FIG. 4 is a diagram showing display contents on a display in the apparatus of FIG. 1.

FIG. 4 is a diagram showing specific display contents on the display 3 (reference numeral 12 in FIG. 1). As shown in the diagram, a plurality of dividing areas are provided on the display screen. Areas T1 to T7 are areas to display tubes of paints of the colors corresponding to the color data which has previously been stored in the color data memory. After the user touched such a portion of the touch panel, when he touches the position corresponding to each area of the touch panel, the paint of this color is displayed in such an area and the color data corresponding to such a color is stored into an address corresponding to each area in the color data memory 5.

Each of areas A1 to A9 denotes a developing area of each color and corresponds to a portion in a palette of paints on which the paints are first pressed out and put. An area MD denotes a tone area for developing a color derived from another area or tube, forming a mixed color of a plurality of colors by touching those colors on the touch panel, and displaying the resultant mixed color. The area P1 is the area to display colors to be used in a normal recording mode and a spray recording mode, which will be explained hereinlater. The areas P2 and P3 are the areas to display colors to be used in a gradation recording mode, which will be described hereinafter.

Each of R1 to R7 denotes an area to indicate the color which was once used as a registration color. From those areas R1 to R7 as well, the colors can be also shifted to the other areas, so that the areas can be used to form different colors. An area SW is a switch area to switch the kinds of tubes of paints displayed in the areas T1 to T7. By operating the switch area SW, many colors can be preset. In the embodiment, 28 colors are prepared as predetermined colors and the color data corresponding to such 28 colors is stored in the color data memory 5. By subsequently switching the displays of seven colors every operation of the switch area SW, all colors are displayed by the operations of four times of the switch area SW.

An area N denotes an area to instruct the normal recording mode; GR an area to instruct the gradation recording mode; and SP an area to instruct the spray recording mode.

Figures 5, 5A:
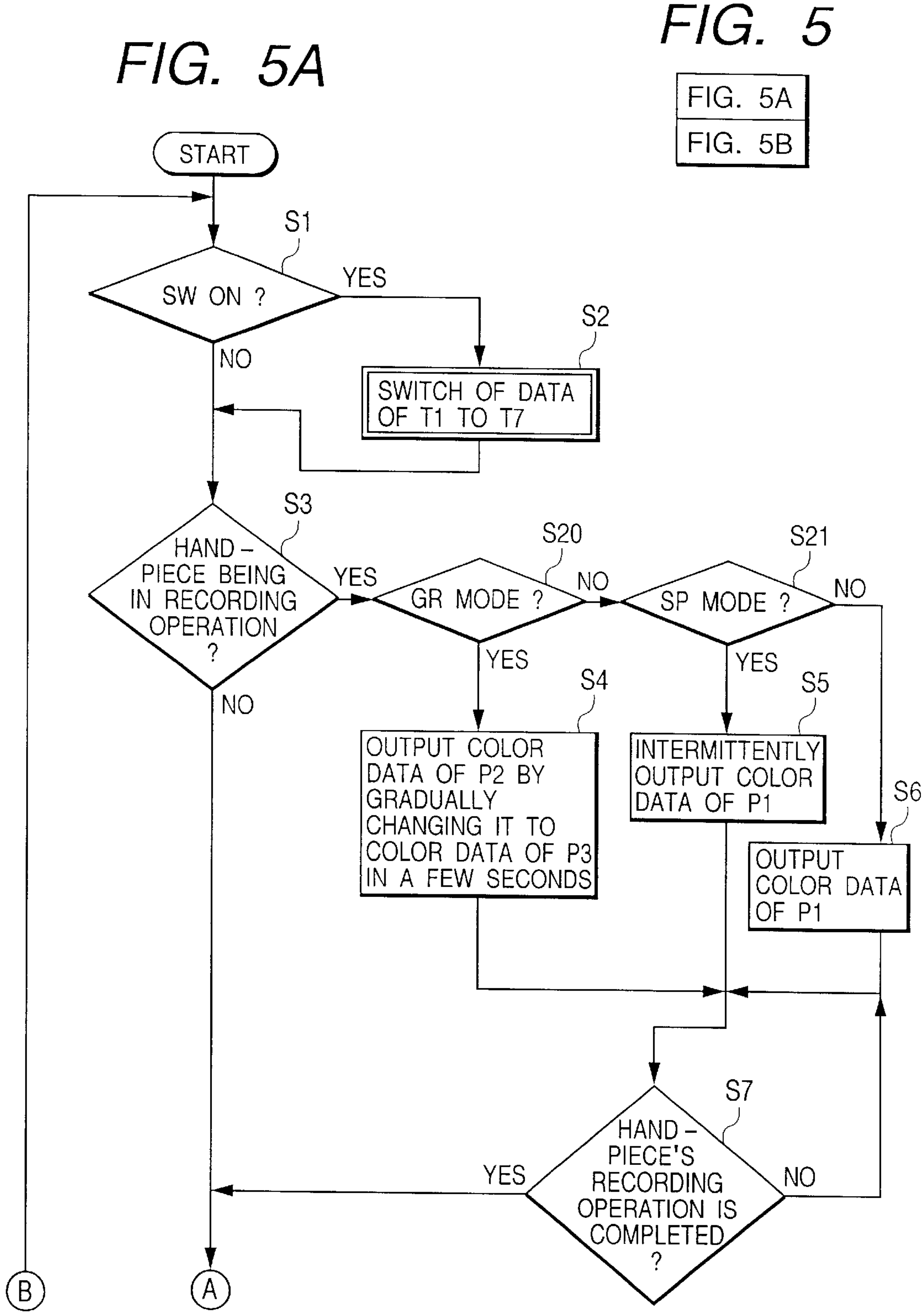
FIG. 5 is comprised of FIGS. 5A and 5B showing flowcharts illustrating the operation of the apparatus of FIG. 1.
Figure 5B:
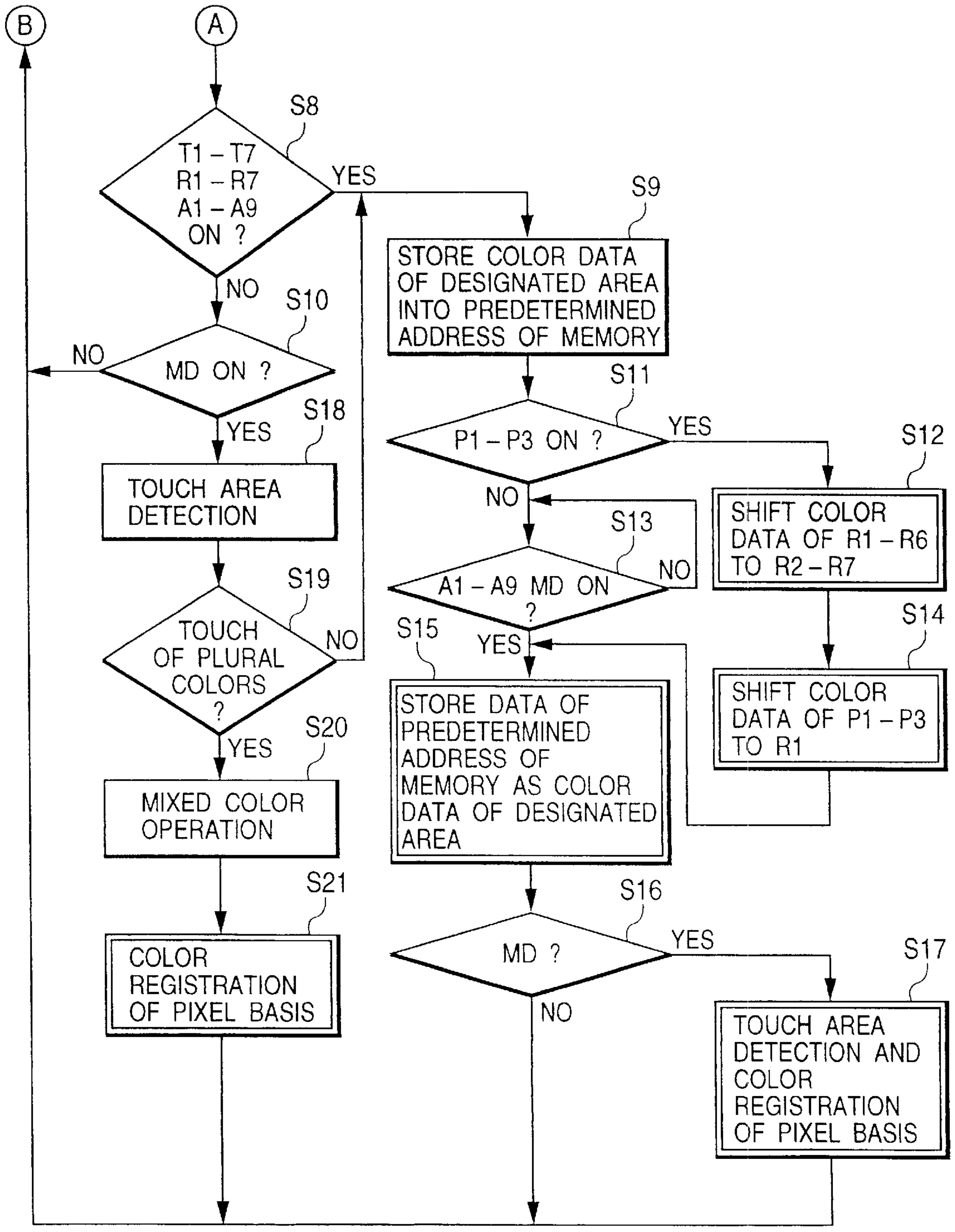

FIGS. 5A and 5B are flowcharts for explaining the operation of the MPU 2. The operation of the apparatus of the embodiment will now be explained in detail hereinbelow with reference to the flowchart. In the flowchart of FIGS. 5A and 5B, a step surrounded by a double-framed rectangle indicates that a process for switching a display of the display is performed in addition to the described process.

When a power source switch (not shown) is turned on, in steps S1, S3, S8, and S10 in FIGS. 5A and 5B, the processing routine advances to a mode for judging whether the areas of respective portions of the display 12, namely, the touch panel 13 have been operated or not. In this instance, when it is judged that the area SW has been operated in step S1, step S2 follows and the color data stored in the addresses corresponding to the areas T1 to T7 in the color data memory 5 is rewritten to the color data corresponding to the other seven colors of the foregoing 28 colors. The tubes of the paints of the colors corresponding to the stored color data are newly displayed in the areas T1 to T7 on the display.

When it is judged that any one of the group of the areas T1 to T7, A1 to A9, and R1 to R7 have been operated in step S8, step S9 follows and the color data of the designated (operated) areas is stored into a predetermined address in the memory. In this instance, a state in which the paints of the color of the touched area has been adhered to the finger touched onto the touch panel 13 is imaged.

Although the color adhered to the finger can be shifted to any one of the areas P1 to P3, A1 to A9, and MD by touching such an area, when shifting to any one of the areas P1 to P3 to set a color to be actually recorded, such a state is judged in step S11 and step S12 follows. In this instance, in order to shift the color arranged in any one of the areas P1 to P3 just before to the registering area R1, the colors arranged in the registering areas R1 to R6 are shifted to the registering areas R2 to R7, respectively. The shift is accomplished by switching the display on the display 12 and transferring the color data stored in addresses corresponding to the areas R1 to R6 in the color data memory 5 to addresses corresponding to the areas R2 to R7. In this instance, the color data stored in an address corresponding to the area R7 is abandoned.

Subsequently, step S14 follows and the color arranged in any one of the areas P1 to P3 just before is shifted to the area R1 and the color data stored in an address corresponding to any one of the areas P1 to P3 in the color data memory 5 is also shifted to an address corresponding to the area R1.

After the end of step S14, the processing routine advances to step S15. When any one of the areas A1 to A9 and MD is designated as an area to which the color adhered to the finger as mentioned above is put, it is judged in step S13 and the processing routine directly advances to step S15.

In step S15, as mentioned above, the color data stored in a predetermined address in the memory is shifted to an address corresponding to the area in the color data memory 5 designated in step S11 or S13. In association with it, the MPU 2 controls the display data forming circuit 4, thereby switching the display on the display 12 to a display indicating that the color adhered to the finger has been shifted to the designated area.

When the area of the shift destination is the MD area, an occupied range of the color on the MD area is also an important factor from a viewpoint of the relation of a color mixing process, which will be explained hereinlater. Therefore, in this case, the processing routine advances from step S16 to step S17 and the area to which the user touched on the touch panel 13 by the finger is detected and the color data is stored into the address in the color data memory provided on a pixel unit basis of the touched area.

The color mixing/adjusting process will now be explained hereinbelow. When it is detected in step S10 that the MD area has been operated, first in step S18, the touch area is detected. When the touch area lies within an area of a single color on the display 12, namely, an area of the pixel corresponding to the address in which the single color has been stored in the color data memory 5, it is judged that the operation is not the color mixing/adjusting process but a process to merely adhere the color to the finger. The processing routine advances to step S9 mentioned above and the data of this color is stored into the foregoing predetermined address. The subsequent processes are as mentioned above.

When the area touched in step S19 corresponds to an area over the plurality of colors on the display 12, namely, an area corresponding to the address in which a plurality of kinds of colors have been stored in the color data memory 5, it is judged that the operation is the operation for the color mixing/adjusting process. Step S20 follows. In step S20, each color data of the pixels corresponding to the touch area on the touch panel 13 is detected and such plural color data is subjected to a weighted mean in accordance with an area ratio of the touched pixels, thereby arithmetically operating a new color. The operation is executed by the operation circuit 6.

The newly operated color is stored into all addresses in the color data memory corresponding to the above touched pixels. Therefore, if such a color mixing/adjusting operation is repeated, the color mixture and color adjustment of the new color and the other colors can be performed. The colors which were successively formed as mentioned above become recording colors by the hand-piece 19 by shifting to the areas P1 to P3.

As will be obviously understood from the above-mentioned explanation, the operation as mentioned above becomes the operation by touching the touch panel 13 by the finger and the color mixing process or the like can be also performed with a sense as if the paints are mixed by the finger.

Finally, the operation when an actual recording is performed will now be described.

When it is detected that the operating unit 21 of the hand-piece 19 has been depressed in the direction of an arrow in FIG. 1 in step S3, the processing routine advances to step S20 and subsequent steps in accordance with the detection and the recording operation is started.

The apparatus of the embodiment has the normal recording mode to record the color on the area P1 by a predetermined line width, the spray recording mode to intermittently record the color on the area P1 as if the color is sprayed by a spray, and the gradation recording mode to record while gradually changing from the color on the area P2 to the color on the area P3. Those modes are set by operating the areas N, GR, and SP on the touch panel 13, respectively. The apparatus has been always set to any one of those three recording modes.

When the operating unit 21 of the hand-piece 19 is operated and the apparatus is in the gradation recording mode, the processing routine advances from step S20 to step S4. The MPU 2 allows the operation circuit 6 to arithmetically operate the color data which gradually changes from the color data corresponding to the color on the area P2 to the color data corresponding to the color on the area P3 for a predetermined time (several seconds). The operated color data is supplied to the hand-piece 19 through the color data transfer circuit 7 and I/F 8. Thus, the gradation recording is realized.

On the other hand, when the operating unit 21 of the hand-piece 19 is operated and the apparatus is in the spray recording mode, the processing routine advances from step S21 to step S5. The MPU 2 intermittently reads out the color data corresponding to the color on the area P1 from the color data memory or properly mixedly reads out the above color data and the color data indicative of white, and supplies to the hand-piece 19 through the color data transfer unit 7 and I/F 8. Thus, the spray recording is realized.

When the operating unit 21 of the hand-piece 19 is operated and the apparatus is in neither the spray recording mode nor the gradation recording mode, step S6 follows. The MPU 2 reads out the color data corresponding to the color on the area P1 and supplies to the hand-piece 19 through the color data transfer unit 7 and I/F 8. Therefore, the recording by the designated color with a predetermined line width is realized.

Characteristics points of the above embodiment are as follows.

The apparatus comprises: the display; the main body housing for enclosing the display and the data processing unit for allowing the display to display predetermined colors and mixed colors of those colors and forming color data corresponding to the colors displayed on the display; and the hand-piece, connected to the main body housing through the connecting portion, for receiving the color data transferred through the connecting portion and for recording by recording materials corresponding to the colors displayed on the display. Therefore, the color recording apparatus fully eliminates the image of such a kind of conventional apparatus such as PC and color printer and can be lightheartedly used by the user.

The data processing unit can shift the predetermined colors or mixed colors on the display, allows a new mixed color among a plurality of predetermined colors or the mixed colors shifted to the same area on the display onto the display, and also forms the color data corresponding to the new mixed color. Therefore, the user can tone a desired color and record it by the hand-piece with a sense like a palette of paints. Further, the apparatus has the touch panel on the display and performs the shift of colors on the display in accordance with the operation of the touch panel, so that the process by the operation which is closer to that of the palette of paints can be executed. Further, by deciding a color mixing ratio to form a new mixed color on the basis of the operation area ratio on the touch panel, even a feeling as if the paints are mixed by the finger is provided.

Various recording modes can be also set and the user can draw a desired picture. The apparatus also has a holder portion rotatably supported to the housing. When the apparatus is used, by arranging the holder portion in almost parallel with the display surface, a holding feeling like a palette of paints can be further provided.

According to the invention as described above, the quite novel popular color recording apparatus which breaks the existing system such as PC and color printer can be provided.

Many widely different embodiments of the present invention may be constructed without departing from the spirit and scope of the present invention. It should be understood that the present invention is not limited to the specific embodiments described in the specification, except as defined in the appended claims.

What is claimed is:

1. A color recording apparatus, comprising:

a touch panel which has a display area which displays pre-prepared representative colors and a toning area which tones a plurality of representative colors;

a hand-piece adapted to form a color which is designated on said touch panel according to a manual designation, onto a recording medium;

a main body housing adapted to enclose said touch panel and said hand-piece; and a setting unit adapted to set a desired color by mixing the selected representative colors in the toning area based on the user's instruction, said setting unit being built into and inside side main body, wherein said hand-piece includes an operation unit disposed on said hand-piece and adapted to form the color set by said setting unit onto said recording medium according to a designation by said operation unit.

2. An apparatus according to claim 1, wherein said setting unit decides a color mixing ratio of the representative colors on the basis of an area ratio of said display of the representative colors.

3. An apparatus according to claim 1, wherein said setting unit sets a forming method of the color set by said setting unit.

4. An apparatus according to claim 3, wherein the forming method includes a gradation method which gradually changes from the color data corresponding to the color displayed on the manually designated area to the color data corresponding to an another color to said hand-piece.

5. An apparatus according to claim 1, wherein said hand-piece includes therein a storing member for storing recording materials of a plurality of colors.

6. An apparatus according to claim 1, wherein said hand-piece has a bubble-jet recording head.

7. An apparatus according to claim 1, further comprising a holder portion rotatably supported to said housing, and wherein said holder portion is arranged to be aligned with a surface of said display when the apparatus is used.

8. An apparatus according to claim 7, wherein a notch portion is provided between said holder portion and said housing for enabling said housing to be easily held by hand.

9. An apparatus according to claim 7, wherein an enclosing portion of said hand-piece is provided on said holder portion.

10. An apparatus according to claim 7, wherein said holder portion has a knob which can be freely enclosed.

* * * * *